N. J. BRUROCK.
TOY RIDING HORSE.
APPLICATION FILED JULY 5, 1918.
1,289,382.
Patented Dec. 31, 1918.
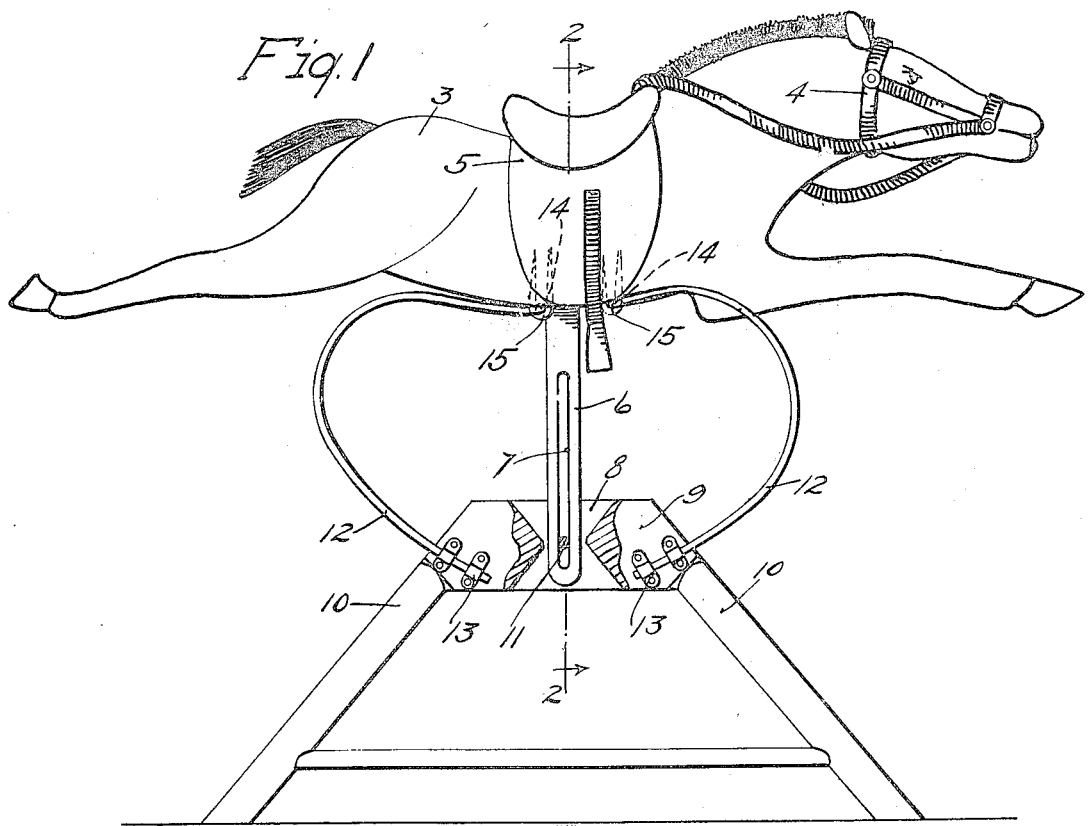
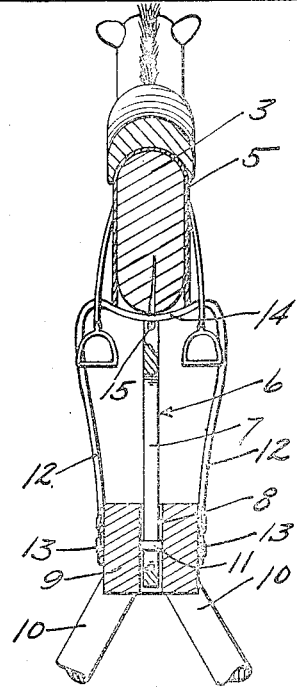
WITNESSES
E. E. Wells
H. D. Kilgore
INVENTOR
Nelson J. Brurock
BY HIS ATTORNEYS
Williamson & Merchant

UNITED STATES PATENT OFFICE.

NELSON J. BRUROCK, OF MONTEVIDEO, MINNESOTA.

TOY RIDING-HORSE.

1,289,382.

Specification of Letters Patent. Patented Dec. 31, 1918.

Application filed July 5, 1918. Serial No. 243,251.

*To all whom it may concern:*

Be it known that I, NELSON J. BRUROCK, a citizen of the United States, residing at Montevideo, in the county of Chippewa, and State of Minnesota, have invented certain new and useful Improvements in Toy Riding-Horses; and I do hereby declare the following to be a full, clear, and exact description of the invention, such as will enable others skilled in the art to which it appertains to make and use the same.

My invention relates to improvements in toy riding horses and has for its object to provide such a toy that will have the natural movement of a horse and, at the same time, overcome the objection to the ordinary rocking horse, in that it will not injure carpets or polished floors.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Figure 1 is a side elevation of the invention, with some parts broken away and some parts sectioned; and Fig. 2 is a vertical section taken on the line 2—2 of Fig. 1.

The numeral 3 indicates a toy riding horse having a bridle 4 and a saddle 5. This horse also preferably has only a single front leg and a single rear leg. Rigidly secured to the body of the horse 3, is a flat depending guide bar 6 having a longitudinal slot 7. This guide bar 6 extends into a slot 8 formed in a base 9 supported on four widely spread legs 10. A pin 11, extended through the two slots 7 and 8 and having its ends anchored in the body of the horse, connects the horse to the base, with freedom for up, down, forward and backward movements. The formation of the slot 8 is such as to hold the guide bar 6, and hence the horse, against sidewise movement, but it will permit free vertical forward and backward movements of said bar.

Front and rear springs 12 support the horse 3 on the base 9. These two springs 12 are bowed, the former forward and the latter rearward with the guide bar 6 extending therebetween. Each spring 12 is formed, as shown, from a single rod bent to form a pair of laterally spaced arms, the lower end portions of which are rigidly secured to the sides of the body 9 by clips 13. To further secure the arms to the base 9, the extreme lower ends thereof are bent laterally and inserted in bores formed in said body.

Between the arms of each spring 12, is a transverse horizontal portion 14 on which the body of the horse 3 is supported. These transverse spring portions are located, the one just forward of the guide bar 6 and the other just rearward thereof and are secured to the body of the horse by staples 15, or other clips, which permit a hinge-like movement of the body on each spring. The spread of the arms of the springs 12 is such as to permit free movement of the horse therebetween. The guide bar 6 holds the horse against extreme sidewise movement, with respect to the base, and the pin 11 limits the up and down movement thereof.

Obviously, the widely spread legs 10 of the base 9 securely support the horse without danger of up-setting and, as said base is stationary, the legs thereof will not mar the floor or damage a carpet on which they rest.

A child riding on the horse can cause the same, through the action of the springs, to imitate different gaits of a horse.

What I claim is:—

1. The combination with a stationary base, of a toy riding horse, a spring supporting the horse from the base, and a guide bar rigidly secured to the horse and extending into a guide slot in the base with freedom for up, down, forward and backward movements.

2. The combination with a stationary base, of a toy riding horse, a spring supporting the horse from the base, a depending guide bar rigidly secured to the horse and extending into a guide slot in the base, said slot being formed to permit vertical, forward and backward movements to the guide bar, and a slot and pin connection between the base and guide bar.

3. The combination with a stationary base, of a toy riding horse, front and rear bow springs supporting the horse from the base, each of said springs being formed from a rod bent to form a pair of laterally spaced arms connected at their upper ends by a transverse portion to which the body of the horse is pivoted, a depending guide bar rigidly secured to the horse and extending into a guide slot in the base, said slot being formed to permit vertical, forward and backward movements to the guide bar, a longitudinal slot in the guide bar, and a pin extended through both of said slots and having its ends anchored in the base.

In testimony whereof I affix my signature in presence of two witnesses.

NELSON J. BRUROCK.

Witnesses:
E. V. BENSEL,
C. D. BENSEL.